US010099870B2

(12) United States Patent
Ebner et al.

(10) Patent No.: US 10,099,870 B2
(45) Date of Patent: Oct. 16, 2018

(54) HANDLING DEVICE

(71) Applicant: EBNER INDUSTRIEOFENBAU GMBH, Leonding (AT)

(72) Inventors: Robert Ebner, Leonding (AT); Fritz Josef Ebner, Wilhering (AT); Rudolf Steinheimer, Micheldorf (AT)

(73) Assignee: Ebner Industrieofenbau GMBH, Leonding (AT)

( * ) Notice: Subject to any disclaimer, the term of this patent is extended or adjusted under 35 U.S.C. 154(b) by 850 days.

(21) Appl. No.: 14/433,561

(22) PCT Filed: Oct. 2, 2013

(86) PCT No.: PCT/EP2013/070554
§ 371 (c)(1),
(2) Date: Apr. 3, 2015

(87) PCT Pub. No.: WO2014/053550
PCT Pub. Date: Apr. 10, 2014

(65) Prior Publication Data
US 2015/0225189 A1 Aug. 13, 2015

(30) Foreign Application Priority Data
Oct. 4, 2012 (DE) .................. 10 2012 218 159

(51) Int. Cl.
*B21D 22/02* (2006.01)
*B65G 65/02* (2006.01)
(Continued)

(52) U.S. Cl.
CPC ............... *B65G 65/02* (2013.01); *B21J 1/06* (2013.01); *B21J 5/06* (2013.01); *B65G 49/00* (2013.01);
(Continued)

(58) Field of Classification Search
CPC .... B21J 1/06; B21J 5/06; B65G 49/00; B65G 65/005; B65G 69/20; C21D 9/0018; F27B 9/028; F27B 9/24; F27B 9/40; F27B 3/06
(Continued)

(56) References Cited

U.S. PATENT DOCUMENTS

2011/0094282 A1    4/2011  Overrath et al.
2012/0073347 A1*   3/2012  Luckey ............... B21D 22/022
                                                            72/324
(Continued)

FOREIGN PATENT DOCUMENTS

CN    1051873 A    6/1991
CN    2383845 Y    6/2000
(Continued)

OTHER PUBLICATIONS

First Chinese Office action issued in parallel Chinese Application No. 201380052186.9 dated Apr. 11, 2016 with English Translation.
(Continued)

*Primary Examiner* — David B Jones
(74) *Attorney, Agent, or Firm* — Lewis Roca Rothgerber Christie LLP

(57) ABSTRACT

Embodiments of the present invention relate to a handling device for handling a metal component part between a furnace device and a further processing device. The handling device comprises a temperature-control chamber, in which the metal component part can be inserted, and a conveying device. The temperature-control chamber comprises a temperature-control unit that adjusts a temperature in the temperature-control chamber. The temperature-control chamber can be conveyed between a receiving position, in which the metal component part can be conveyed from the furnace device into the temperature-control chamber, and a dispensing position, in which the metal component part can be
(Continued)

conveyed from the temperature control chamber to the further processing device. The conveying device is configured in such a manner that the metal component part can be conveyed in the receiving position by means of the conveying device between the furnace device and the temperature-control chamber and that the metal component part can be conveyed in the dispensing position by means of the conveying device between the temperature-control chamber and the further processing device.

19 Claims, 4 Drawing Sheets

(51) Int. Cl.
    *B21J 1/06*     (2006.01)
    *C21D 9/00*     (2006.01)
    *F27B 9/24*     (2006.01)
    *F27B 9/02*     (2006.01)
    *F27B 9/40*     (2006.01)
    *F27D 3/06*     (2006.01)
    *B21J 5/06*     (2006.01)
    *B65G 49/00*     (2006.01)
    *B65G 65/00*     (2006.01)
    *B65G 69/20*     (2006.01)
    *C21D 9/48*     (2006.01)
    *C21D 1/673*     (2006.01)

(52) U.S. Cl.
    CPC ........... *B65G 65/005* (2013.01); *B65G 69/20* (2013.01); *C21D 9/0018* (2013.01); *F27B 9/028* (2013.01); *F27B 9/24* (2013.01); *F27B 9/40* (2013.01); *F27D 3/06* (2013.01); *B65G 2201/02* (2013.01); *B65G 2203/0266* (2013.01); *B65G 2814/02* (2013.01); *C21D 1/673* (2013.01); *C21D 9/48* (2013.01)

(58) Field of Classification Search
    USPC ........................................................ 72/419
    See application file for complete search history.

(56) References Cited

U.S. PATENT DOCUMENTS

| | | | | |
|---|---|---|---|---|
| 2013/0111966 | A1* | 5/2013 | Takasue | B21D 22/02 72/360 |
| 2013/0283882 | A1 | 10/2013 | Sikora et al. | |
| 2014/0144198 | A1* | 5/2014 | Potocki | C21D 9/005 72/342.1 |
| 2015/0225189 | A1* | 8/2015 | Ebner | B21J 1/06 72/419 |
| 2015/0246383 | A1* | 9/2015 | Young | B21D 37/16 72/342.3 |

FOREIGN PATENT DOCUMENTS

| | | |
|---|---|---|
| CN | 102000813 A | 4/2011 |
| CN | 201873713 U | 6/2011 |
| CN | 201981233 U | 9/2011 |
| CN | 102517434 A | 6/2012 |
| CN | 102643015 A | 8/2012 |
| CN | 102695809 A | 9/2012 |
| DE | 31 02 638 A1 | 11/1981 |
| DE | 10 2009 019 496 A1 | 11/2010 |
| DE | 10 2009 042 026 A1 | 3/2011 |
| DE | 10 2010 060 207 A1 | 5/2012 |
| EP | 2 204 460 A2 | 7/2010 |
| JP | 52-160606 U | 12/1977 |
| JP | 2006-289425 A | 10/2006 |
| JP | 2007-255882 | 10/2007 |
| WO | WO 2010/127837 A2 | 11/2010 |

OTHER PUBLICATIONS

International Search Report and Written Opinion corresponding to PCT/EP2013/070554, dated Mar. 17, 2014, 10 pages.

Notice of Reasons for Rejection issued by the Japan Patent Office in parallel Japanese Application No. 2015-535007, dated Jun. 20, 2017, 6 pages.

Notice of Allowance issued in parallel Japanese Application No. 2015-535007, dated Feb. 27, 2018, 3 pages.

* cited by examiner

HANDLING DEVICE

CROSS-REFERENCE TO RELATED APPLICATION(S)

This application is a National Phase Patent Application and claims priority to and the benefit of International Application Number PCT/EP2013/070554, filed on Oct. 2, 2013, which claims priority to and the benefit of German Patent Application Number 10 2012 218 159.8, filed on Oct. 4, 2012, the entire disclosures of which are incorporated herein by reference.

TECHNICAL FIELD

Embodiments of the present invention pertains to a handling device for handling a metal component part between a furnace device and a further processing device, a temperature-control unit for producing a metal component part and a method for handling a metal component part.

BACKGROUND OF THE INVENTION

In the metal processing industry such as, for example, in the construction of vehicle bodies, it is preferred to use component parts that have a low weight as well as a desired strength and a desired deformation characteristics. Press-hardened component parts that are produced of high-strength steels and have areas of different ductility are used, for example, in regions of the vehicle body that are subjected to in particular high stresses in case of a crash. Examples of such component parts are the A column and B column, the bumper and the door impact beams of a motor vehicle.

Component parts with regions of different ductility are produced, for example, by means of press-hardening. A starting material or a blank is heated prior to the press-hardening process and is subsequently formed in a press-hardening tool and quenched. For this purpose, the press-hardening tool may comprise devices for cooling or heating the blank.

In order to realize the desired ductility in certain areas of the component part, different structures (e.g. martensitic structures or ferrite) can be adjusted in said regions by means of different cooling times during the hardening of the component part. The more precisely the temperature of the component part can be controlled during the hardening process, the more accurately the desired structure can be adjusted. However, it is very difficult to specify the temperatures and the cooling times during the production because, for example, distances between the furnace and a further processing device will have to be traversed in which distances the component part cools down in a not controllable manner.

DISCLOSURE OF THE INVENTION

There may be a need to develop a handling device for a metal component part with certain ductile properties, wherein more accurate temperatures of the metal and more accurate cooling down times can be specified during the production process.

This need is met by a handling device for handling a metal component part between a furnace device and a further processing device, with a temperature-control unit for producing a metal component part and by means of a method for handling a metal component part according to the independent claims.

According to a first aspect of the present invention, a handling device for handling a metal component part between a furnace device and a further processing device is described. The handling device comprises a temperature-control chamber, into which the metal component part can be placed. The temperature-control chamber comprises a temperature-control unit for tempering the metal component part. The temperature-control unit adjusts a temperature in the temperature-control chamber. The temperature-control chamber furthermore comprises a traversing device that is designed in such a way that the temperature-control chamber can be displaced between a receiving position and a dispensing position. In the receiving position, the metal component part can be conveyed from the furnace device into the temperature-control chamber and in the dispensing position the metal component part can be conveyed from the temperature-control chamber to the further processing device. A conveying device is designed in such a way that in the receiving position the metal component part can be conveyed between the furnace device and the temperature-control chamber and in the dispensing position the metal component part can be conveyed between the temperature-control chamber and the dispensing position.

According to another exemplary embodiment, a handling method for handling a metal component part is described. According to the handling method, a temperature-control chamber of a handling device is displaced into a receiving position, in which the metal component part can be received from a furnace device into the temperature-control chamber, by means of a traversing device. The temperature-control chamber comprises a temperature-control unit for tempering the metal component part. The metal component part is conveyed from the furnace device into the temperature-control chamber by means of a conveying device. The temperature-control chamber is displaced into a dispensing position, in which the metal component part can be transferred from the temperature-control chamber to a further processing device. The metal component part is conveyed from the temperature-control chamber to the dispensing position by means of the conveying device. The temperature-control unit tempers the metal component part when the metal component part is situated in the temperature-control chamber. For example, the temperature-control unit adjusts a specified temperature in the temperature-control chamber for this purpose.

In the context of the present application, the term metal component part describes a metal work piece or a semi-finished product (metal blank), of which a component part with a desired shape and ductility is produced. The metal component part is, e.g., a metal blank. For example, the metal blank is a metal sheet with a thickness of less than approximately 2 cm, in particular less than approximately 1 cm. A metal structure such as, for example, a motor vehicle component can be produced by means of the metal component part. The motor vehicle component may represent, for example, an A-column or B-column of a motor vehicle, a bumper or a door impact beam of a motor vehicle.

The metal component part may consist of a steel that may contain production-related impurities in addition to iron. For example, the metal component part may furthermore contain alloying constituents such as (in wt.-%) C: 0.02-0.6%, Mn: 0.5-2.0%, Al: 0.01-0.06%, Si: 0.1% up to 0.4%, Cr: 0.1% up to 1.2%, P: 0 up to 0.035% and S: 0 up to 0.035%. In addition, the metal component part may contain one or more elements of the group comprising Ti, B, M, Ni, Cu and/or N, wherein the Ti content may lie between 0 and 0.05%, the Cu content may lie between 0 and 0.01%, the B content may lie between 0.0008 and 0.005%, the Mo content may lie between 0 and 0.3%, the Ni content may lie between 0 and 0.4% and the N content may lie between 0 and 0.01%. The respective C content is in particular important with regard to the strength of the component part. The Si, Mn, Cr and B contents serve, for example, for forming the bainite and reduce the formation of larger quantities of martensite in the structure of the component part.

The furnace device serves for heating up the metal component part in order to subsequently further process this metal component part in a hardening process, in particular a press-hardening process. The metal component part is heated, in particular, to the austenitizing temperature in the furnace device. For example, the austenitizing temperature lies between approximately 750° C. and approximately 1000° C., wherein the lower limit of the austenitizing temperature depends on the material of the metal component part (steel and alloying proportions). The structure in the metal component part is completely austenitic above the austenitizing temperature.

For example, the furnace device may comprise a plurality of additional furnace levels or furnace modules that are arranged, for example, adjacent to one another or on top of one another. A corresponding metal component part can be placed into each of the furnace modules and heated. The temperature-control chamber can be displaced into a corresponding plurality of different receiving positions such that the corresponding metal component parts can be removed from the respective furnace modules and conveyed into the temperature-control chamber. In a preferred embodiment, the furnace device comprises, in particular, six to eight furnace levels or furnace modules that are arranged on top of one another.

In the following, the further processing device may consist of a simple delivery table, onto which the metal component part can be placed. Further, the further processing device may also comprise a tool such as, e.g., a forming tool or in particular a press-hardening tool. The tool may furthermore be considered as to be an assembly unit or a welding robot.

The traversing device may comprise, for example, a frame of metal beams, along which guide rails are arranged. For example, the temperature-control chamber may be arranged on or coupled to these guide rails in a displaceable manner.

The temperature-control chamber comprises, for example, a housing that forms an internal volume, into which the metal component part can be placed. The housing of the temperature-control chamber may be produced of a metallic body. The temperature-control chamber may furthermore comprise two housing halves that can be moved relative to one another. In this case, the housing halves can be moved apart from one another in order to access the internal volume and place the metal component part therein. The housing halves can then once again be moved towards one another in order to enclose the internal volume.

The temperature-control unit is designed in such a way that the housing or the inner surface of the housing respectively has at least one temperature region with a desired temperature. In addition, the temperature-control unit may be designed in such a way that a plurality of different temperature regions can be adjusted at the housing or at the inner surface thereof such that corresponding temperature zones or tempered spatial regions can be respectively adjusted in the internal volume of the temperature-control chamber. Adjacent spatial regions can be adjusted by purposefully tempering the corresponding temperature regions of the housing or by means of the direct inflow of a tempered fluid into the corresponding spatial regions. For example, the spatial regions may have the same temperature or correspondingly different temperatures as required.

As passive temperature-control units insulating devices such as, for example, insulating mats or cavities for insulation may be provided in order to realize the temperature-control chamber with insulating and tempering properties.

The temperature-control unit as an active temperature-control unit comprises, for example, heating devices and/or cooling devices in order to adjust desired temperatures in the internal volume and, in particular, in individual spatial regions of the internal volume. The temperature-control chamber can be heated and/or cooled by means of the temperature-control unit. In this way, the metal component part arranged in a designated position in the internal volume of the temperature-control chamber can be maintained at a desired temperature, in particular in an isothermal fashion. Furthermore, the metal component part can be cooled in the temperature-control chamber by specifying a corresponding temperature in the temperature zones or spatial regions of the temperature-control chamber. Consequently, a desired temperature profile or cooling profile of the metal component part can be specified in the temperature-control chamber, in particular in a spatial region of the internal volume of the temperature-control chamber. Due to the tempering of the different spatial regions, certain areas of the metal component part can be acted upon with locally different temperature profiles. In other words, a first area of the metal component part situated in a first spatial region of the temperature-control chamber can be acted upon with a first temperature profile and a second area of the metal component part situated in a second spatial region of the temperature-control chamber can be acted upon with a second temperature profile. In addition, the active temperature-control unit may comprise tempering elements (e.g. the above-described insulating elements) of the passive temperature-control unit.

A temperature profile (e.g. a cooling profile) describes a course of temperature (e.g. of an area) of the metal component part along a certain time history (temperature/time). A temperature profile may also comprise a time segment with a constant temperature (so-called isothermal soaking) or a time segment with an increasing temperature. While the metal component part cools, different structural portions adjust themselves in the metal component part depending on the temperature and the cooling speed, wherein these structural portions significantly influence the ductility of the finished component part. For example, a metal component part with a high martensite content is less ductile than a metal component part with a high pearlite content.

The temperature in the internal volume of the temperature-control chamber can be adjusted, for example, between approximately 100° C. and approximately 800° C. When the metal component part is uniformly heated in the temperature-control chamber, the temperature in the internal volume of the temperature-control chamber can essentially be maintained constant between about 930° C. and 980° C. The tempering of the temperature-control chamber makes it possible, for example, to act upon regions of metal component part with a temperature profile, according to which the metal component part can be cooled or heated with speeds between approximately 3 K/s and approximately 20 K/s. When the metal component part is heated, the heating speed may in particular lie between approximately 1 K/s and approximately 20 K/s. The tempering of the temperature-control chamber also makes it possible, for example, to quench areas of the metal component part, i.e. cooling speeds between approximately 40 K/s and approximately 200 K/s can be achieved.

Which structures adjust within the metal component part during the heating, preserving or cooling phase can be gathered from a time-temperature transformation diagram (TTT diagram). In a TTT diagram, the structural development is plotted as a function of different courses of temperature or cooling speeds during the cooling phase.

A desired structure (e.g. martensitic, bainitic, ferritic or pearlitic) or a mixed structure consisting of several structural portions therefore is formed during the cooling phase. In order to solidify the desired structure or mixed structure, the metal component part is then swiftly cooled (or quenched) such that, for example, the desired structure is also present in the metal component part at room temperature.

The metal component part is tempered in the temperature-control chamber in accordance with a predetermined temperature profile. For example, the metal component part or a desired region of the metal component part is intermediately cooled to a predetermined temperature and isothermally preserved until the dispensing position is reached. The temperature-control unit may also have a sufficient cooling capacity for quenching the metal component part in the temperature-control chamber. The term quenching refers to cooling a metal component part, for example, with a cooling speed between approximately 40 K/s and approximately 200 K/s.

Since the metal component part is held in a predetermined position in the internal volume of the temperature-control chamber, desired regions of the metal component part can be purposefully tempered by controlling the temperature in the spatial regions of the internal volume of the temperature-control chamber accordingly. In this way, first regions of the metal component part may, for example, be acted upon with a first temperature profile in the temperature-control chamber and second regions can be acted upon with a second temperature profile. For example, a first region of the temperature profile can be maintained at a certain temperature while second regions of the metal component part are cooled or quenched.

The conveying device for conveying the metal component part may either be arranged stationary or such that it can be displaced between the receiving position and the dispensing position together with the temperature-control chamber. The conveying device may be directly arranged at the temperature-control chamber or arranged in a displaceable manner at an external frame consisting of metal beams. In the receiving position, the conveying device moves into the furnace device and conveys the metal component part from the furnace device into the temperature-control chamber. In this case, the conveying device may, for example, move underneath the metal component part and subsequently lift the metal component part. Accordingly, the metal component part then lies on the conveying device. Additionally or alternatively, the conveying device may comprise gripping elements that actively take hold of the metal component part in the furnace and fix the metal component part on the conveying device.

In the temperature-control chamber, the conveying device can deposit the metal component part and subsequently the conveying device can firstly receive and convey the metal component part once again in the dispensing position. Alternatively, the metal component part is permanently held in the temperature-control chamber by means of the conveying device such that the conveying device takes hold of the metal component part in the receiving position and only releases the metal component part again in the dispensing position.

The conveying device is, in particular, an asynchronous conveyor that conveys the metal component part from the furnace device into the chamber in the receiving position, subsequently, during the displacement of the chamber from the receiving position into the dispensing position, holds the metal component part in the temperature-control chamber, and ultimately conveys the metal component part from the chamber to the further processing device in the dispensing position.

The conveying device may comprise, for example, a conveying fork or a loading fork, e.g., with several parallel supporting rods or a supporting grate, onto which the metal component part can be placed for the purpose of carriage. The conveying device may furthermore comprise a conveyor belt or a conveyor chain in order to correspondingly drive, for example, the conveying fork or other supporting devices, on which the metal component part lies. In addition, the conveying device may comprise a conveying robot with a gripper arm for actively gripping the metal component part. For example, the gripper arm may comprise clamping devices or suction cups for receiving the metal component part.

With the described handling device there is allowed an efficient production of a metal component part with certain structural regions and corresponding ductile properties. The handling device bridges the distance between the furnace device and a further processing device such as, e.g., the finishing tool. During the transfer of the metal component part from the furnace to the further processing device, the tempered temperature-control chamber acts upon corresponding regions of the metal component part with a desired temperature profile.

In conventional production methods, an undefined and uncontrollable temperature deviation occurs during a transfer of the metal component part from the furnace to the further processing device and causes an undefined and uncontrollable structure in the finished metal component part. With the inventive handling device there is created a temperature-controlled environment for the metal component part during its transfer from the furnace device to the further processing device. In addition, the metal component part is already acted upon with a desired temperature profile during the transfer between the furnace device and the further processing device, i.e. the metal component part is subjected to a cooling process or an isothermal preserving. Furthermore, the internal volume of the temperature-control chamber can be divided into (e.g. differently) tempered spatial regions by means of the temperature-control unit such that different regions of the metal component part can be differently heated, isothermally preserved or cooled, i.e. acted upon with desired temperature profiles, during the transfer with the temperature-control chamber. In this way, desired structural properties can already be adjusted in the metal component part during the transport in the temperature-control chamber.

According to another exemplary embodiment, the traversing device is designed in such a way that the temperature-control chamber can be displaced between a plurality of spaced-apart receiving positions, in which the metal component part can be conveyed from the furnace device into the temperature-control chamber, and the dispensing position. By means of this exemplary embodiment, the temperature-control chamber can, in a manner of speaking, remove metal component parts from different spaced-apart furnace levels and deliver these metal component parts to a common further processing device or a common dispensing position.

The temperature-control chamber may alternatively also be arranged in such a way that it can be displaced not only into a plurality of additional spaced-apart receiving positions, but also into a plurality of additional dispensing positions such as, for example, different further processing devices by means of the traversing device.

The temperature-control chamber can be displaced, in particular, horizontally between the furnace device and the further processing device and/or vertically or up and down between the furnace device and the further processing device.

According to an exemplary embodiment, the temperature-control chamber comprises at least one opening, through which the metal component part can be placed into the temperature-control chamber. The temperature-control chamber may furthermore comprise a closing device (movable flap, slide or door), by means of which the opening can be selectively closed. Due to this closing device, the internal volume can be isolated during the displacement of the chamber between the receiving position and the dispensing position. In this way, the temperature-control chamber can be tempered in a more effective and more exact fashion. The closing device opens the opening in the receiving position and in the dispensing position such that the metal component part can be respectively placed into the temperature-control chamber or removed from the temperature-control chamber. Accordingly, an opening may be arranged in the temperature-control chamber in order to receive the metal component part in the receiving position and an additional opening may be arranged in the temperature-control chamber in order to remove the metal component part from the temperature-control chamber. The additional opening can accordingly be closed by means of an additional closing device.

The (additional) closing device may comprise corresponding flaps or closing elements in order to selectively open or close the opening or the additional opening.

Furthermore, the closing device may be realized in the form of a lifting device and the housing may be formed of two or more parts. For example, the housing may consist of an upper housing shell and a lower housing shell, wherein the lifting device is designed for moving the upper housing shell and the lower housing shell towards one another into a closed position or apart from one another into an open position. The internal volume of the temperature-control chamber is accessible in the open position such that the conveying device can convey the component part into or out of the temperature-control chamber. In the closed position, the housing shells form a closed and isolated housing.

According to another exemplary embodiment, the traversing device comprises a drive device for displacing the temperature-control chamber. For example, the traversing device comprises a belt drive, a chain drive, a hydraulic drive, an electric drive and/or a linear motor.

According to another exemplary embodiment, the temperature-control unit is designed in such a way that spatial regions in the temperature-control chamber can be tempered in a controlled fashion in order to act upon the metal component part with a location-dependent temperature profile in the temperature chamber.

The temperature-control unit is designed, for example, in such a way that the temperature of the metal component part can be adjusted in at least one of the spatial regions by conveying a fluid with a predetermined temperature into the respective spatial region. For example, the fluid with a predetermined temperature can be introduced into at least one of the spatial regions of the internal volume. The fluid may be, for example, a tempered gas, a vapor or a liquid. Furthermore, the fluid may be introduced under pressure in order to achieve an effective tempering process. In other words, the temperature-control unit can introduce, for example, compressed air or a (protective) gas with high oxygen content into predefined spatial regions of the internal volume of the temperature chamber with a desired temperature. In this way, a predetermined temperature is adjusted in the spatial regions.

For this purpose, (gas) nozzles may be arranged at the inner wall of the housing of the temperature-control chamber, wherein said nozzles can be selectively activated in order to introduce correspondingly tempered fluid. In addition, blower openings may be arranged on the inner wall such that a blower can introduce a volume flow of correspondingly tempered fluid into respective spatial regions of the internal volume.

The above-described temperature-control unit comprises a circulation system in order to effectively implement the temperature-control unit. The circulation system comprises suction nozzles or suction openings in the inner wall of the chamber. Accordingly, the fluid introduced into certain spatial regions of the temperature-control chamber with a predetermined temperature can be removed through these suction nozzles or suction openings. Subsequently, the removed fluid can be tempered anew and reintroduced in order to temper the spatial regions in the internal volume.

According to another exemplary embodiment, the temperature-control unit is designed in such a way that the housing or a housing section of the temperature-control chamber can be heated with a predetermined temperature such that the metal component part or a region of the metal component part can be acted upon with a location-dependent temperature profile in the temperature-control chamber. The inner wall of the housing, in particular, can be heated with a predetermined temperature such that the desired spatial regions can be correspondingly tempered in the spatial regions of the internal volume. Certain regions of the inner wall in particular can be heated differently.

For example, the temperature-control unit comprises at least one fluid channel, through which the fluid is conveyed. A fluid channel may extend, in particular, at the inner side of the housing that is directed towards the internal volume or an opposite outer side of the housing, wherein a fluid (such as, for example, a tempered gas or a liquid) can be introduced into said fluid channel with a certain temperature in order to adjust the regions of the inner wall and therefore the spatial regions of the internal volume. The fluid channel may furthermore extend along the housing in a meander-shaped fashion. The fluid channel may comprise different channel branches that extend along the housing. Each channel branch can be selectively activated, e.g., by means of the control unit such that the fluid with a predetermined temperature flows through the respectively activated channel branch. The channel branches therefore cover regions of the housing such that these regions can be purposefully heated. These regions of the housing then correspondingly temper the spatial regions of the internal volume by means of radiant heating or cooling.

Alternatively or additionally to the fluid channel and its channel branches, the temperature-control unit may also comprise an electric heating element. The electric heating element can be controlled in such a way that the housing or a housing section can be heated with a predetermined temperature such that the metal component part can be acted upon with a location-dependent temperature profile in the temperature-control chamber. The heating element is, for example, a heat radiator such as an infrared radiator and may be arranged along the inner wall of the housing in order to purposefully heat the regions of the housing.

The housing may furthermore be covered with a heatable ceramic element or ceramic coating at its inner side in the direction of the internal volume in order to respectively realize radiant heating or radiant cooling by means of the heatable (e.g. glowing) ceramic element or the cooled ceramic element.

According to another exemplary embodiment, the conveying device is coupled to the temperature-control chamber in such a way that the conveying device can be moved into and out of the temperature-control chamber. In addition, the conveying device may also remain or stay in the temperature-control chamber during the displacement of the temperature-control chamber between the receiving position and the dispensing position.

When the conveying device or the part of the conveying device carrying or taking hold of the metal component part is situated in the internal volume, the conveying device is heated to and maintained at a desired temperature. This means that no temperature difference at all or only a slight temperature difference exists between the conveying device and the metal component part in the contact region of the conveying device with the metal component part in the receiving position. Consequently, the metal component part is gently received by the conveying device without causing excessive cooling or heating of the metal component part in the contact region with the conveying device when the metal component part is received. This reduces thermal tensions in the component part when the metal component part is received by the conveying device.

For example, the conveying device is pre-heated to a desired temperature in the temperature-control chamber by means of the temperature-control unit before the conveying device receives the metal component part in the receiving position. If the conveying device is purposefully pre-cooled, for example, the region of the metal component part contacting the conveying device can be purposefully cooled or quenched when the metal component part is received by the conveying device.

According to another exemplary embodiment, the temperature-control chamber is designed in such a way that there is no contact or virtually no contact between the metal component part and the housing or its inner wall when the metal component part is situated in the internal volume of the temperature-control chamber.

For example, certain holding elements for holding the metal component part may be arranged in the temperature-control chamber in order to realize a clearance between the inner wall of the housing and the metal component part. The conveying device may furthermore be realized in the form of a holding element in the temperature-control chamber in order to thusly prevent the metal component part from contacting the inner wall. In this way, an air cushion is formed in a gap between the inner wall and the metal component part. This air cushion can positively affect the insulating properties of the temperature-control chamber.

In another exemplary embodiment, the temperature-control chamber is designed in such a way that the metal component part contacts the inner wall of the housing of the temperature-control chamber at least in certain regions when the metal component part is situated in the internal volume of the temperature chamber. A desired temperature of the metal component part can be adjusted in a faster and more effective manner in the contact regions between the inner wall and the metal component part. For example, the direct contact of regions of the inner wall with regions of the metal component part makes it possible to quench these areas. The regions of the inner wall may be cooled, for example, in order to allow rapid quenching of the contacting areas of the metal component part. For example, the entire metal component part may also be in contact with the inner wall such that the entire metal component part or regions of the metal component part can be quickly and effectively adjusted to a certain temperature.

According to another exemplary embodiment, the handling device comprises a control unit that controls the temperature-control chamber, the traversing device and/or the conveying device in such a way that the following procedure for handling the metal component part can be carried out:

displacing the temperature-control chamber into the receiving position, in which the metal component part can be transferred from the furnace device into the temperature-control chamber, conveying the metal component part from the furnace device into the temperature-control chamber by means of the conveying device, displacing the temperature-control chamber into the dispensing position, in which the metal component part can be transferred from the temperature-control chamber to the further processing device, tempering the metal component part by means of a temperature-control unit of the temperature-control chamber, and conveying the metal component part from the temperature-control chamber to the dispensing position by means of the conveying device.

For example, the control unit may carry out a programmable process. The control unit may furthermore comprise a database, in which the desired temperatures for the desired spatial regions of the internal volume are stored and from which said temperatures can be retrieved by the processor. In addition, the control coordinates of the temperature-control chamber, the temperature-control unit, the traversing device and the conveying device may be stored as parameters in the database. It would also be possible to store the corresponding coordinates of the furnace device, in particular the individual furnace levels, as well as of the corresponding receiving positions and dispensing positions. Furthermore, certain parameters for the identification of certain metal component parts may be stored in the database. For example, parameters of the geometry and of the material composition of different metal component parts may be stored. The user can input, for example, the shape, the material and the desired ductility of the metal component part, whereupon the processor invokes corresponding process parameters (temperature, cooling times or temperature profiles, motion coordinates for the temperature-control chamber and for the conveying device, as well as corresponding coordinates for the receiving positions and dispensing positions) and the handling device is controlled accordingly by the control unit. The control unit can also control the furnace device such that a desired temperature exists in the corresponding furnace levels.

It should be noted that embodiments of the invention were described with reference to different aspects of the invention. A few embodiments of the invention are described, in particular, with reference to device claims and other embodiments of the invention are described with reference to procedural claims. Upon reading this application, however, it will immediately become clear to a person skilled in the art that, if not explicitly indicated otherwise, not only features pertaining to one aspect of the invention can be combined, but features pertaining to different aspects of the invention also can be arbitrarily combined.

BRIEF DESCRIPTION OF THE DRAWINGS

In order to further elucidate and better understand embodiments of the present invention, exemplary embodiments thereof are described in greater detail below with reference to the attached drawings.

DETAILED DESCRIPTION OF EXEMPLARY EMBODIMENTS

Identical or similar component parts are identified by the same reference symbols in the figures. The figures merely show schematic illustrations.

Figure 1:
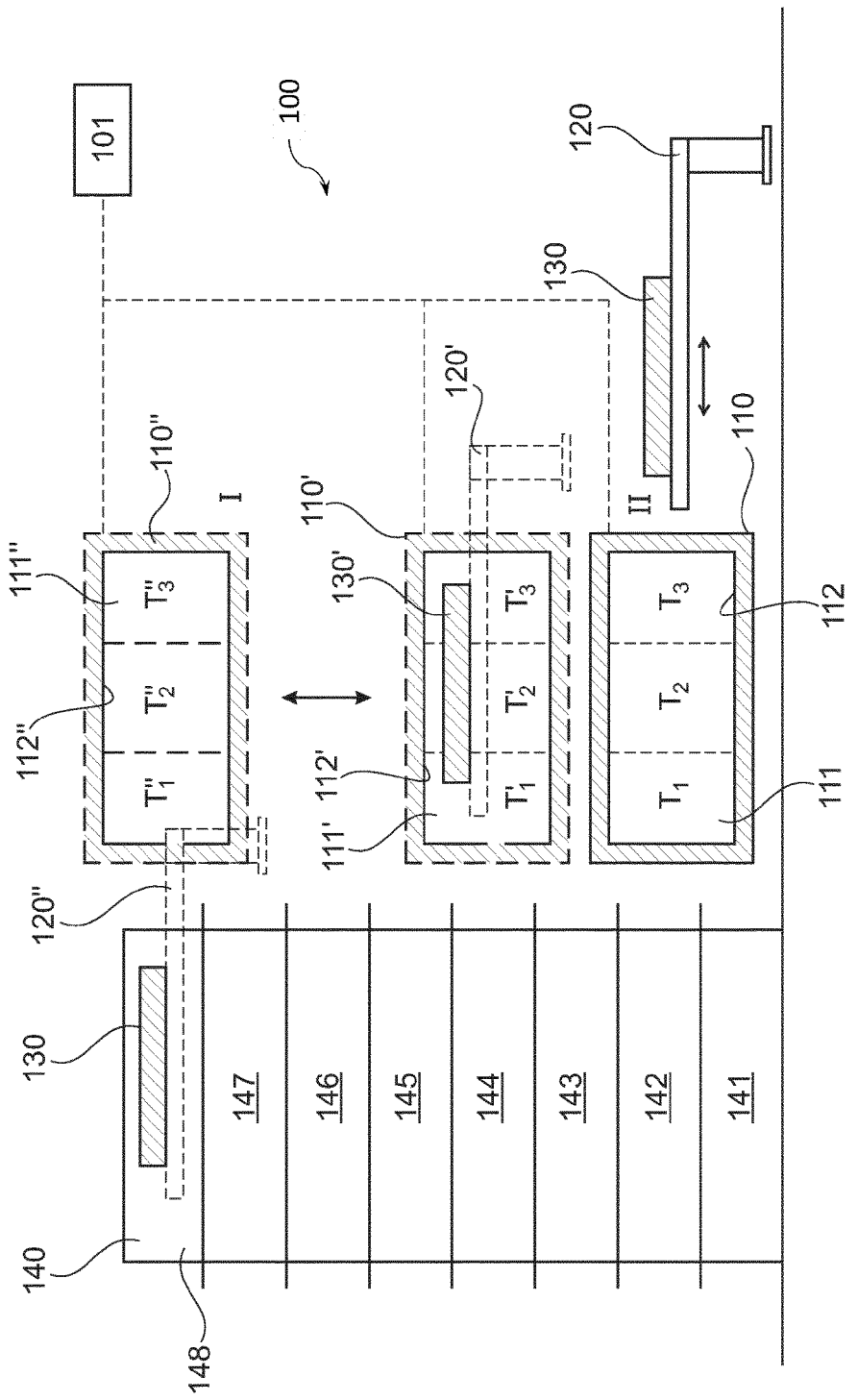
FIG. 1 shows a temperature-control unit according to an exemplary embodiment of the present invention.

FIG. 1 shows a temperature-control unit for tempering a metal component part 130. The temperature-control unit comprises a furnace device 140 for heating the metal component part 130 and a handling device 100 for handling the metal component part 130 between the furnace device 140 and a further processing device. According to FIG. 1, the furnace device 140 comprises, for example, eight furnace modules 141 to 148. The furnace modules 141 to 148 are spaced apart from one another and arranged, for example, on top of one another. A corresponding metal component part 130 can be pre-heated to a desired temperature such as, for example, an austenitizing temperature in excess of 750° C. in each of the furnace modules 141 to 148.

The handling device 100 comprises a temperature-control chamber 110, into which the metal component part 130 can be respectively placed or inserted. The temperature-control chamber 110 comprises a temperature-control unit that can adjust a temperature in the temperature-control chamber 110. In FIG. 1, the temperature-control chamber 110 is illustrated in a receiving position I, in an intermediate position and in a dispensing position II. The temperature-control chamber 110 can be respectively displaced vertically or up and down as illustrated in an exemplary fashion in FIG. 1.

In the receiving position I, the metal component part 130 can be conveyed from the furnace device 140 (or one of the furnace modules 141 to 148) whereas the metal component part 130 can in the dispensing position II be conveyed from the temperature-control chamber 110 to the further processing device (such as, e.g., a delivery table or a forming tool).

In order to convey the metal component part 130, the handling device 100 comprises a conveying device 120 that is designed in such a way that the metal component part 130 can in the receiving position I of the temperature-control chamber 110 be conveyed between the furnace device 140 and the temperature-control chamber 110 and the metal component part 130 can in the dispensing position II be conveyed between the temperature-control chamber 110 and the dispensing position.

The temperature-control chamber 110 comprises, for example, a housing with an inner wall 112 that forms an internal volume 111. The metal component part 130 can be placed into the internal volume 111. The temperature-control unit is furthermore designed in such a way that several spatial regions T1, T2, T3 of the internal volume 111 can be purposefully tempered. The temperature-control unit may comprise, for example, an electric heating element or a fluid-cooled tempering element (such as, for example, a fluid channel) arranged at the inner wall 112. Furthermore, the spatial regions T1, T2, T3 can be adjusted by respectively introducing a correspondingly tempered fluid into the internal volume 111 or into one of the spatial regions T1, T2, T3.

In FIG. 1, the furnace modules 141 to 148 of the furnace device 140 are arranged on top of one another. Accordingly, a traversing device can displace the temperature-control chamber 110 vertically or up and down in order to reach each of the furnace modules 141 to 148.

Once the temperature-control chamber 110 has arrived in the receiving position I of a desired furnace module 141 to 148, the conveying device 120 moves into the corresponding furnace module 141 to 148 in order to receive the metal component part 130 being heated therein. Subsequently, the conveying device 120 moves into the internal volume 111 of the temperature-control chamber 110. In the next step, the temperature-control chamber 110 is correspondingly displaced from the receiving position I into the dispensing position II by means of the traversing device.

During the displacement of the temperature-control chamber 110, the conveying device 120 can be positioned in the internal volume 111 in order to correspondingly temper the conveying device. The conveying device 120 therefore has the same temperature as the internal volume 111 and accordingly the same temperature as the metal component part 130 held thereon. The conveying device 120 can hold the metal component part 130 in a desired position in the internal volume 111 during the displacement of the temperature-control chamber 110. The conveying device 120 may alternatively transfer the metal component part 130 to a holding device arranged in the internal volume 111. Furthermore, a conveying device 120 may be arranged in the receiving position I in order to convey the metal component part 130 into the temperature-control chamber and an additional conveying device 120 may be arranged in the dispensing position II in order to convey the metal component part 130 to the further processing device.

Once the temperature-control chamber 110 has arrived in the dispensing position II, the conveying device 120 conveys the metal component part 130 out of the internal volume 111. In the dispensing position II, the metal component part 130 can be transferred to a further processing device such as, for example, a press-hardening tool with a desired temperature in order to be further processed.

The conveying device 120, the temperature-control chamber 110 and, if applicable, the furnace device 140 can be controlled by a control unit 101.

The temperature-control unit is controlled, in particular, in such a way that the internal volume 111 or the spatial regions T1, T2, T3 in the temperature-control chamber 110 can be tempered in a controlled fashion in order to act upon the metal component part 130 with a location-dependent temperature profile in the temperature-control chamber 110.

Figure 2:
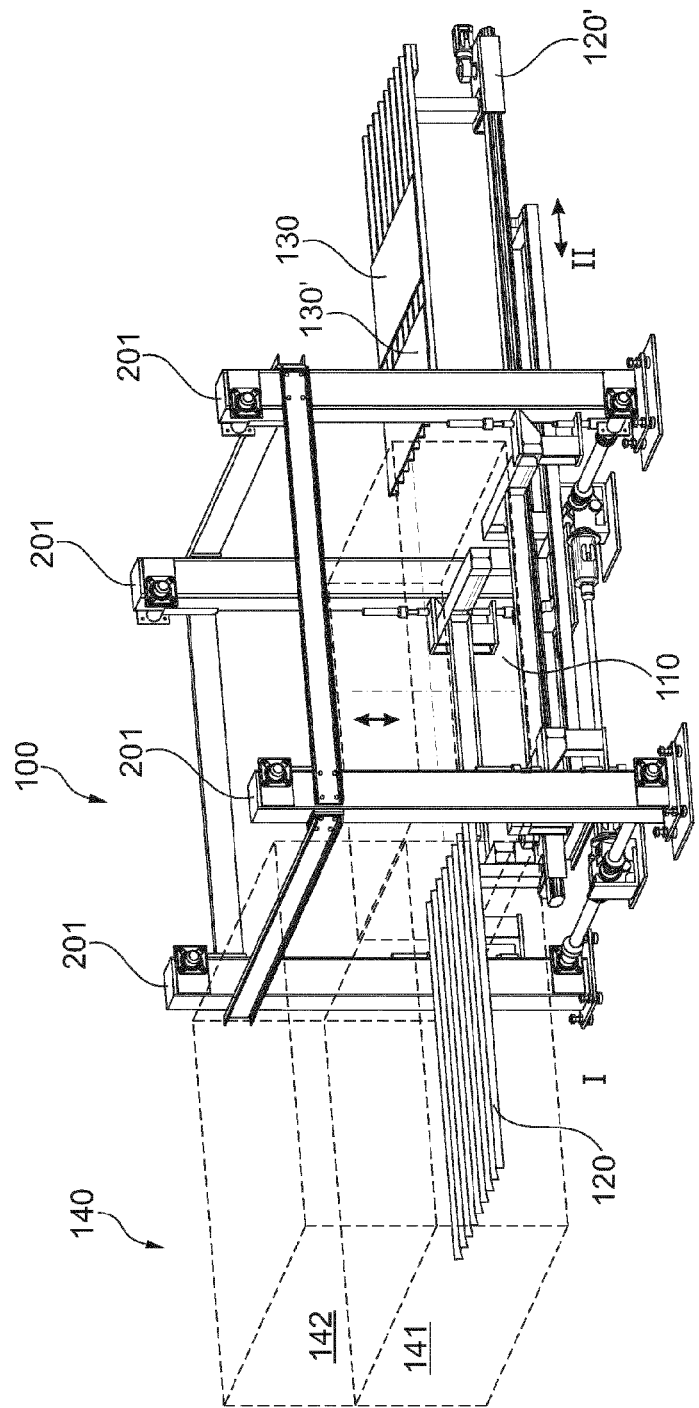
FIG. 2 shows a perspective view of a temperature-control unit according to an exemplary embodiment of the present invention, and FIG. 3 to FIG. 5 schematically show a temperature-control chamber with exemplary embodiments of the temperature-control unit.

FIG. 2 shows a perspective view of the temperature-control unit according to FIG. 1. The first furnace module 141 and the second furnace module 142 are schematically illustrated in the furnace device 140.

The conveying device 120 for conveying corresponding metal component parts 130 from the first furnace module 141 into the temperature-control chamber 120 is illustrated at the left side in FIG. 2. In the dispensing position II, the conveying device 120' is moved out of the temperature-control chamber 110 in order to convey the metal component part 130, 130' to the further processing device (see right side in FIG. 2).

As is illustrated in FIG. 2, the conveying device 120 comprises, for example, a supporting platform that consists, e.g., of parallel rods or of conveying or loading forks, onto which the corresponding metal component parts 130 can be placed.

In order to receive the metal component part 130 from a corresponding furnace module 141, 142, each furnace module 141, 142 may comprise, for example, a supporting surface, on which the metal component part 130 lies. The supporting surface may furthermore contain grooves or channels, into which the loading forks (or the parallel rods) of the conveying device 120 can engage. Subsequently, the conveying device 120 and/or the temperature-control chamber 110 can be slightly raised vertically such that the loading forks lift the metal component part 130 off the supporting surface. The loading forks of the conveying device 120 can then be displaced into the internal volume 111 of the temperature-control chamber 110 together with the received metal component part 130.

The temperature-control chamber 110 is subsequently displaced from the receiving position I into the dispensing position II. FIG. 2 shows a special case, in which the receiving position I of the temperature-control chamber 110 is identical or similar to the dispensing position II.

As it is illustrated in FIG. 2, the traversing device comprises, e.g., a displaceable frame, at which the temperature-control chamber 110 is mounted. The traversing device furthermore comprises a drive unit and metal beams 201. The frame can be displaced, e.g., vertically or up and down along the metal beams 201 by means of the drive unit. For example, guide rails, to which the frame is coupled in a displaceable manner, are arranged on the metal beams 201 for this purpose.

Once the temperature-control chamber 110 is situated in the desired dispensing position II, the loading forks of the conveying device 120 can be moved out of the internal volume 111 and the metal component part 130 can be transferred to a further processing device.

Figure 3:
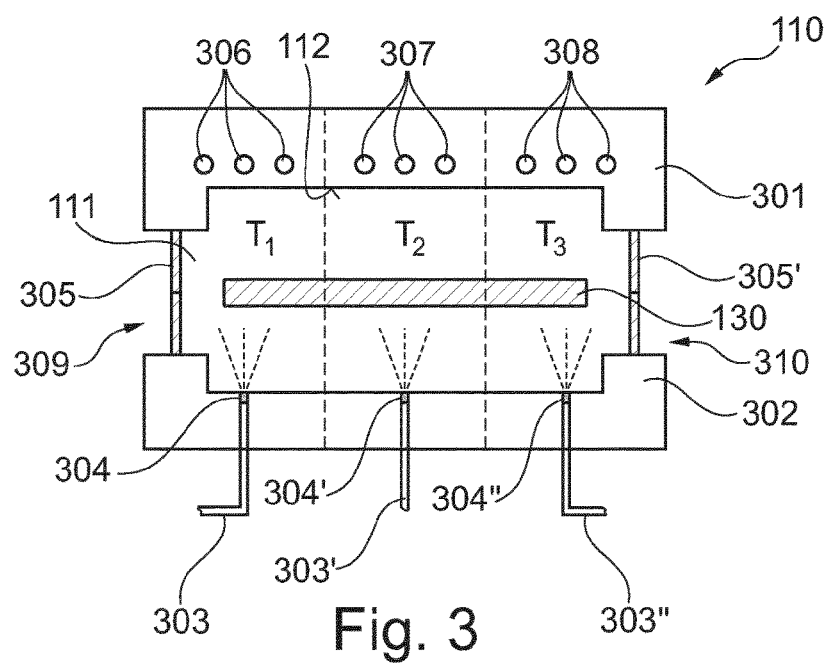
Figure 4:
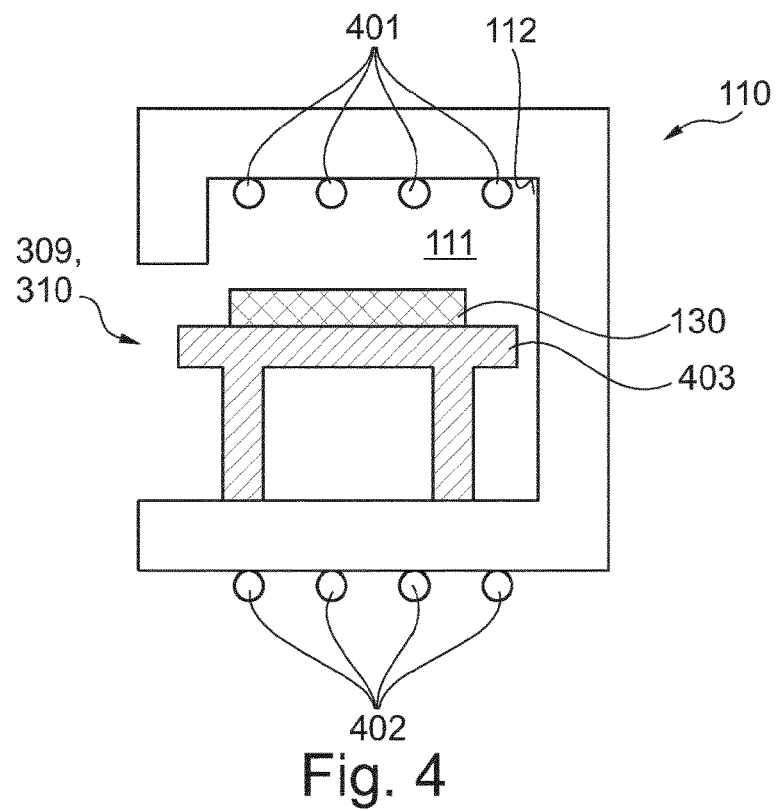
Figure 5:
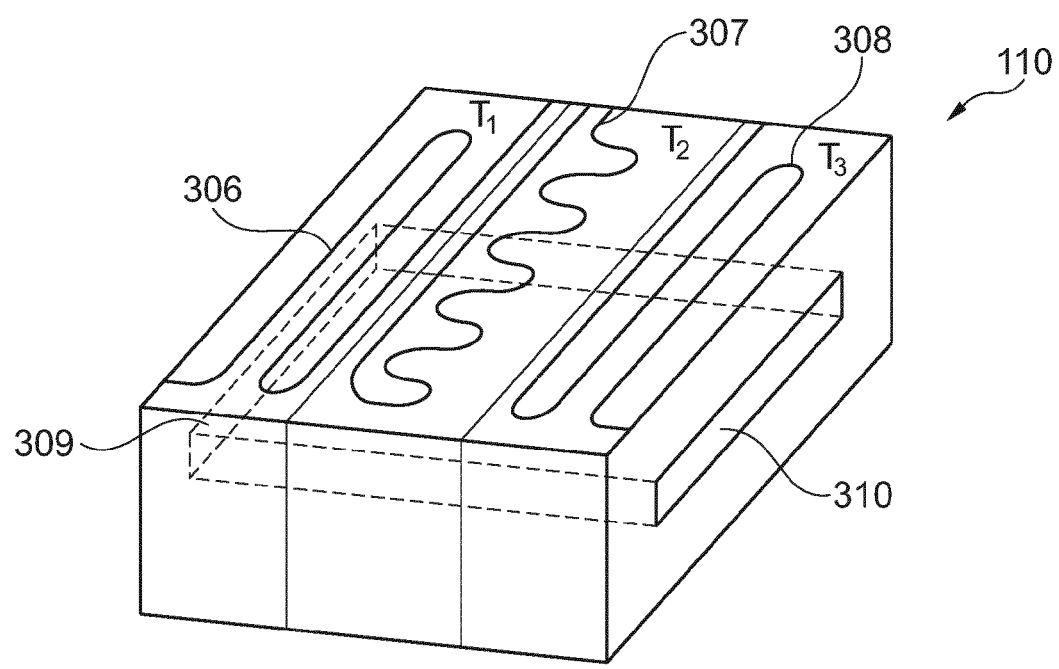

FIG. 3 to FIG. 5 schematically show a temperature-control chamber 110 with exemplary embodiments of the temperature-control unit.

The temperature-control chamber 110 may consist, for example, of a monolithic or integral body or of an upper housing shell 301 and a lower housing shell 302 as illustrated in FIG. 3. The temperature-control chamber 110 may comprise an opening for inserting and removing the metal component part 130. According to FIG. 3, the temperature-control chamber 110 may also comprise an input opening 309 for placing the metal component part 130 into the internal volume 111 of the temperature-control chamber 110 and an output opening 310 for removing the metal component part 130 from the internal volume 110. A corresponding closing device 305, 305' may be respectively arranged at the input opening 309 and/or the output opening 310. The closing device 305, 305' may comprise, for example, displaceable or pivotable door elements that can be purposefully opened and closed such that the internal volume 111 can on the one hand be accessed through the corresponding openings 309, 310 and a good insulation of the internal volume 111 is on the other hand realized in the closed state of the openings 309, 310.

In order to purposefully temper the different spatial regions T1, T2, T3 in the internal volume 111 of the temperature-control chamber 110, different tempering lines 306, 307, 308 may be provided as illustrated in an exemplary fashion in the upper housing shell 301. For example, a fluid with a first temperature can flow through the first tempering line 306, a fluid with a second temperature can flow through the second tempering line 306 and a fluid with a third temperature can flow through the third tempering line 308 such that the temperatures of the spatial regions T1, T2, T3 are adjusted accordingly by means of radiant heating or radiant cooling. The tempering lines 306, 307, 308 may furthermore represent electric heating lines that correspondingly temper the spatial regions T1, T2, T3, for example, by means of resistance heating.

Different fluid supply lines 303, 303', 303" that comprise corresponding nozzle devices 304, 304', 304" in the region of the inner wall 112 of the temperature-control chamber 110 may be provided as illustrated in an exemplary fashion in the lower housing half 302 in FIG. 3. A correspondingly tempered fluid can be conveyed in each of the fluid supply lines 303, 303', 303" and introduced into the internal volume 101 or into the corresponding spatial regions T1, T2, T3 by means of the respective nozzle devices 304, 304', 304" in order to adjust corresponding temperature zones in the spatial regions T1, T2, T3.

FIG. 4 shows another exemplary embodiment of the temperature-control chamber 110. The temperature-control chamber 110 in FIG. 4 is made, for example, of a body and comprises an opening that serves as the input opening 309 and the output opening 310. For example, a holding device 403, onto which the metal component part 130 can be placed, may be arranged in the internal volume 111 of the temperature-control chamber 110. The holding device 403 may furthermore form part of the conveying device 120. In other words, the holding device 403 may be realized, for example, such that it can be moved into and out of the internal volume 111.

A fourth tempering line 401 and a fifth tempering line 402 are illustrated in an exemplary fashion in FIG. 4. The tempering lines 306, 307, 308 extend, for example, within the material of the temperature-control chamber 110. In FIG. 4, in contrast, the fourth tempering line 401 extends along the inner wall 112 of the temperature-control chamber 110. The fifth tempering line 402 alternatively or additionally extends along an outer surface of the temperature-control chamber 110.

In FIG. 5 there is shown another exemplary embodiment of the temperature-control chamber 110. The temperature-control chamber 110 in FIG. 5 comprises a closed body that encloses the internal volume 111. The internal volume 111 is respectively accessible via the input opening 309 and the output opening 310. FIG. 5 furthermore shows the spatial regions T1, T2, T3 that can be tempered by means of the respective tempering lines 306, 307, 308. Exemplary arrangements of the respective tempering lines 306, 307, 308 are illustrated in FIG. 5. For example, the respective tempering lines 306, 307, 308 extend in a meander-shaped manner along the outer surface, within the material of the temperature-control chamber 110 or along the inner wall 112 of the temperature-control chamber 110.

A correspondingly tempered fluid can flow through each of the tempering lines 306, 307, 308. For example, the tempering lines 306, 307, 308 respectively comprise separate fluid circuits such that separate fluids with different temperatures can be introduced into the respective tempering lines 306, 307, 308.

It should be noted further that, in addition to the tempered spatial regions T1, T2, T3 illustrated in FIG. 3 to FIG. 5, only one spatial region or an arbitrary number of different spatial regions T1, T2, T3, Tn can also be individually heated. The features of the individual exemplary embodiments of the temperature-control chamber 110 according to FIGS. 3, 4 and 5, in particular the arrangement of the tempering lines 306, 307, 308, 401, 402 and of the openings 309, 310, may be combined with one another.

As a supplement, it should furthermore be noted that "comprising" does not exclude any other elements or steps and that "a" or "an" does not exclude a plurality. It should also be noted that features or steps that were described with reference to one of the above exemplary embodiments can also be used in combination with other features or steps of other above-described exemplary embodiments. Reference symbols in the claims should not be interpreted in a restrictive sense.

LIST OF REFERENCE SYMBOLS

100 Handling device
101 Control unit
110 Temperature-control chamber
111 Internal volume
112 Inner wall
120 Conveying device
130 Metal component
140 Furnace device
141 First furnace module
142 Second furnace module
143 Third furnace module
144 Fourth furnace module
145 Fifth furnace module
146 Sixth furnace module
147 Seventh furnace module
148 Eighth furnace module
201 Metal beam
301 Upper housing shell
302 Lower housing shell
303 Fluid supply
304 Nozzle
305 Closing device
306 First tempering line
307 Second tempering line
308 Third tempering line
309 Input opening
310 Output opening
401 Fourth tempering line
402 Fifth tempering line
403 Holding device
T1 First temperature zone
T2 Second temperature zone
T3 Third temperature zone
I Receiving position
II Dispensing position

The invention claimed is:

1. A handling device for handling a metal component part between a furnace device and a further processing device, wherein the handling device comprises:
   a temperature-control chamber, into which the metal component part can be placed, wherein the temperature-control chamber comprises a temperature-control unit for temperature controlling the metal component part, and wherein the temperature-control unit is an electric heating element,
   a traversing device wherein the temperature-control chamber can be displaced between a receiving position, in which the metal component part can be conveyed from the furnace device into the temperature-control chamber, and a dispensing position, in which the metal component part can be conveyed from the temperature-control chamber to the further processing device, and
   a conveying device wherein in the receiving position the metal component part can be conveyed between the furnace device and the temperature-control chamber by the conveying device and/or that in the dispensing position the metal component part can be conveyed between the temperature-control chamber and the further processing device by the conveying device.

2. The handling device as set forth in claim 1, wherein the temperature-control chamber can be displaced between a plurality of spaced-apart receiving positions, in which the metal component part can be conveyed from the furnace device into the temperature-control chamber, and the dispensing position.

3. The handling device as set forth in claim 1, wherein the temperature-control chamber comprises at least one opening, through which the metal component part can be conveyed into the temperature-control chamber, and wherein
   the temperature-control chamber furthermore comprises a closing device wherein the opening can be selectively closed.

4. The handling device as set forth in claim 1, wherein the traversing device comprises a belt drive, a chain drive, a hydraulic drive, an electric drive and/or a linear motor.

5. The handling device as set forth in claim 1, wherein spatial regions in the temperature-control chamber can be tempered in a controlled manner in order to act upon the metal component part with a location-dependent temperature profile in the temperature-control chamber.

6. The handling device as set forth in claim 1, wherein a temperature of the metal component part can be adjusted in at least one of the spatial regions by guiding a fluid with a predetermined temperature in the respective spatial region.

7. The handling device as set forth in claim 1, wherein a housing or a housing section of the temperature-control chamber can be heated up to a predetermined temperature such that the metal component part can be acted upon with a location-dependent temperature profile in the temperature-control chamber.

8. The handling device as set forth in claim 6, wherein the temperature-control unit comprises at least one fluid channel, through which the fluid is guided.

9. The handling device as set forth in claim 1, wherein the electric heating element can be controlled so that a housing or a housing section can be heated up with a predetermined temperature such that the metal component part can be acted upon with a location-dependent temperature profile in the temperature-control chamber.

10. The handling device as set forth in claim 1, wherein the conveying device is coupled to the temperature-control chamber so that the conveying device can be moved into and out of the temperature-control chamber.

11. The handling device as set forth in claim 10, wherein the conveying device is situated in the temperature-control chamber during the displacement of the temperature-control chamber between the receiving position and the dispensing position.

12. The handling device as set forth in claim 1, wherein the conveying device comprises a conveying fork for receiving the metal component part.

13. The handling device as set forth in claim 1, wherein the metal component part can be placed into the temperature-control chamber without contacting a housing of the temperature-control chamber.

14. The handling device as set forth in claim 1, wherein the metal component part forms a contact area with the temperature-control chamber when the metal component part is situated in the temperature-control chamber.

15. The handling device as set forth in claim 1, further comprising:
   a control unit that controls the temperature-control chamber, the traversing device and the conveying device to handle the metal component part according to the following steps:
      displacing the temperature-control chamber into the receiving position,
      conveying the metal component part from the furnace device into the temperature-control chamber by the conveying device when the temperature-control chamber is displaced into the receiving position,
      displacing the temperature-control chamber into the dispensing position, and
      conveying the metal component part from the temperature-control chamber to the further processing device by the conveying device when the temperature-control chamber is displaced into the dispensing position.

16. A temperature-control unit for tempering a metal component part, wherein the temperature-control unit comprises:
   a furnace device for heating up the metal component part; and
   a handling device as set forth in claim 1 for handling the metal component part between the furnace device and the further processing device.

17. The temperature-control unit as set forth in claim 16, wherein
   the furnace device comprises at least a first furnace module and a second furnace module,
   wherein the first furnace module is spaced apart from the second furnace module,
   wherein the metal component part can be heated up in the first furnace module and an additional metal component part can be heated up in the second furnace module, and
   wherein the handling device is adapted so that the temperature-control chamber can be displaced into the receiving position, in which the metal component part can be conveyed from the first furnace module into the temperature-control chamber, and that the temperature-control chamber can be displaced into an additional receiving position, in which the additional metal component part can be conveyed from the second furnace module into the temperature-control chamber.

18. The temperature-control unit as set forth in claim 16, wherein the further processing device comprises a forming tool for forming the metal component part or a press-hardening tool for purposefully cooling and forming the metal component part.

19. A method for handling a metal component part by a handling device, wherein the handling method comprises the steps of:
   displacing a temperature-control chamber into a receiving position, wherein the temperature-control chamber comprises a temperature-control unit for tempering the metal component part, and wherein the temperature-control unit is an electrical heating element,
   conveying the metal component part from a furnace device into the temperature-control chamber by a conveying device when the temperature-control chamber is displaced into the receiving position,
   tempering the metal component part in the temperature-control chamber,
   displacing the temperature-control chamber into a dispensing position, and
   conveying the metal component part from the temperature-control chamber to a further processing device by the conveying device when the temperature chamber is displaced into the receiving position.

* * * * *